Jan. 10, 1956         R. T. STAHL         2,729,890
CHEESE SCISSORS FOR ITALIAN CHEESES
Filed Nov. 20, 1952
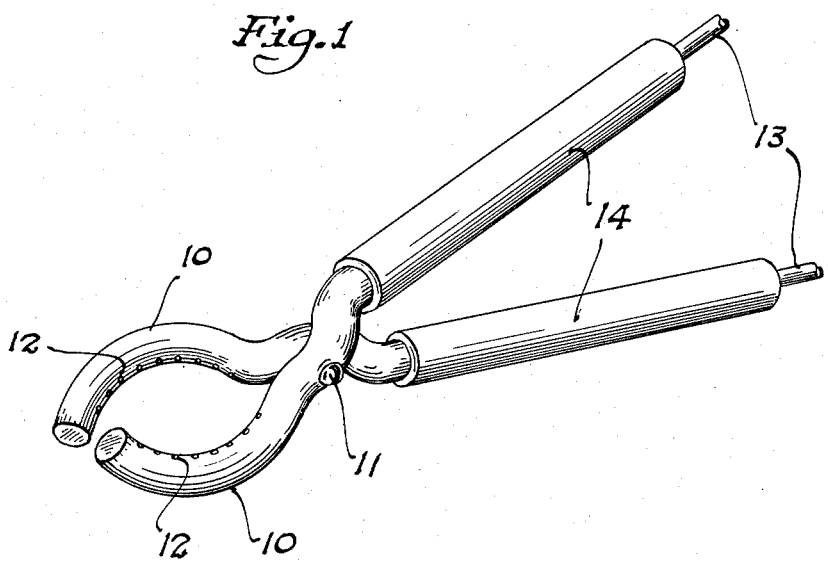
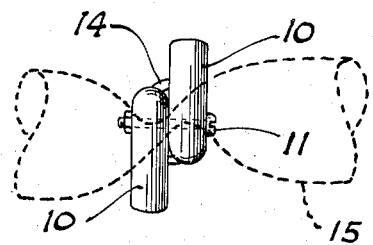
INVENTOR.
Raymond T. Stahl
BY
R. J. Story
ATTORNEY

United States Patent Office 2,729,890
Patented Jan. 10, 1956

2,729,890

CHEESE SCISSORS FOR ITALIAN CHEESES

Raymond T. Stahl, Homewood, Ill., assignor to Swift & Company, Chicago, Ill., a corporation of Illinois Application November 20, 1952, Serial No. 321,615

3 Claims. (Cl. 31—5)

This invention relates in general to apparatus for subdividing sheets or loaves of semi-plastic substances. More particularly, the invention concerns such severing apparatus as applied to cheese, especially of the provolone or cacciacavallo type.

In the manufacture of cheese of the provolone or cacciacavallo type the curd mass is customarily kneaded and rolled by hand or possibly extruded from a hopper so as to result in the production of a cylindrical or loaf-shaped cheese mass. When the conventional hand kneading and molding methods are employed, the curds are so manipulated that a thin film is stretched from one end of the mass until it covers the entirety of the cheese loaf so as to provide a thin smooth-surfaced protective skin, an operation known as healing. The substitution of an ordinary extrusion chamber in loaf formation generally results in a somewhat less perfect but still necessary protective skin. It is undesirable to leave the loaf ends without the protection of the "skin" originally formed on the cheese surface during extrusion or hand manipulation.

When it is desired to subdivide these curd loaves into cheeses of reduced length, an ordinary knife blade generally serves the purpose. However, as a result, the protective film is severed, leaving the cheese end unprotected. Furthermore, if the curds are in a somewhat plastic state at this time, a dry, rigid blade will adhere and thereby cause an uneven product surface.

It is therefore an object of this invention to provide apparatus for subdividing long curd loaves into smaller cheeses without by so doing exposing the newly-cut ends. Another object of the invention is to provide apparatus whereby cutting is facilitated and the resultant newly formed loaf ends appear smooth and properly rounded similar to manually headed provolone and cacciacavallo cheeses.

Various other and ancillary objects and advantages will become apparent during the course of the explanation below.

Briefly, the present invention comprises: passing a loaf, sheet, or cylindrical cheese curd unit, particularly of the provolone or cacciacavallo types between the jaws of a hollow, scissors-like device having holes or slits on the inside of the jaw members from which jets of hot water, steam, or other heated fluid may be caused to issue. The softening effect of the impinging heated liquid or vapor compounded with the mechanical pressure applied to the cheese body by the scissors jaws themselves results in the desired severing of the loaf as well as stretching the cheese skin about the newly formed loaf ends.

A complete understanding of the invention may be obtained by referring to the following description and accompanying drawings which together disclose the operations and features of construction, which constitute the essential novelty.

In the drawings:

Figure 1 is an isometric view of the provolone and cacciacavallo scissors in a partly open position.

Figure 2 is a front view of the scissors of Figure 1 presented in a closed position.

Referring to the figures, the scissors consist of two jaw members 10 rigidly held in such relation to one another by the bolt 11 that an orifice is provided when said jaws are in an open position, the diameter of which is sufficient to admit the cheese curd unit. Tiny holes or slits 12 on the insides of the jaws direct jets of steam or hot water at the center of the orifice through which the product passes when pressure is applied to lines 13. Insulating jackets 14 surround the steam lines 13 so as to provide handles by which an operator may close the scissors and thereby exert mechanical pressure on the curds.

In operation, the device is positioned with jaws opened as shown in Figure 1 so that cylindrical or loaf-shaped curds may be passed therebetween. At the proper moment steam or heated water is introduced into lines 13 so that a flat spray of hot liquid or vapor issues from the holes or slits 12 preferably, but not necessarily, at a right angle to the plane of the curd loaf, impinging on and thereby softening the surface while at the same time rendering more plastic the mass within the skin. The jacketed handles 14, initially at a wide angle relative to one another, may be returned to a nearly parallel position when it is desired to cut the ends into lesser sized cheese units. The jaws 10, pivoting on bolt 11, are forced against and into the semi-plastic curd loaf.

An important function is performed by this mechanical cutting operation beyond simply severing the product, namely, preservation of the protective film or skin, such film being a most necessary part of finished provolone or cacciacavallo-type cheese. By the use of the bunt-edged instrument of this invention the skin is not ruptured as would be the case were a knife employed, but rather the skin-encased curd, rendered semi-plastic by the hot steam or water is forced to either side of the point of pressure application while the surface film, also softened somewhat, is stretched about the ends. The effect is similar to that observed when pressure is applied to the center of a flexible metal toothpaste tube. A narrow waist-like effect results, allowing the two cheese units to be easily torn apart or, alternatively, the jaws may completely separate the units so as to leave both newly-formed ends protected by a smooth, stretched, protective skin. Additionally, the easily damaged sharp corners which result from the use of a knife are not formed, but rather the evenly-rounded ends, peculiar to newly-molded provolone and cacciacavallo result. Finally, the use of water or steam eliminates any tendency of the plastic curds to adhere to the metal surface.

Various modifications and changes in both method and construction, such as varying somewhat the curvature of the jaws so as to make them suitable for use with square or sheet-like curd loaves, may be made without departing from the scope of the invention disclosed, and therefore only such limitations should be imposed on the invention as are indicated in the appended claims.

I claim:

1. Apparatus for subdividing semi-plastic loaves into units of lesser length comprising: opposingly-positioned, blunt-edged, hollow jaw members mounted for pivotal motion, said jaws when in an open position describing an annular orifice and when closed substantially occluding said annular orifice, means for introducing a fluid under pressure into said hollow jaw members and means positioned on the inside surfaces of said jaw members for producing a substantially single planar fluid spray.

2. Apparatus for subdividing semi-plastic loaves into units of lesser length which comprises: a first hollow jaw member; a second hollow jaw member mounted thereon and capable of pivotal motion in a plane parallel to that of said first jaw member, each of said jaw members having a substantially coplanar surface so that upon closing said jaws, said adjacent surfaces are substantially in contact with one another; means for introducing a fluid under pressure into hollow jaw members; and means positioned on the inside surfaces of said jaw members for producing a substantially single planar fluid spray.

3. Apparatus for subdividing semi-plastic loaves into units of lesser length which comprises: opposingly-positioned, blunt-edged hollow jaw members mounted for scissors-like motion relative to one another; means for introducing a fluid under pressure into said hollow jaw members and means positioned on the inside surfaces of said jaw members for producing a substantially single planar fluid spray.

References Cited in the file of this patent

UNITED STATES PATENTS

| | | |
|---|---|---|
| 144,972 | Foulke | Nov. 25, 1873 |
| 2,042,227 | Hensel | May 26, 1936 |
| 2,111,273 | Becker | Mar. 15, 1938 |
| 2,114,077 | Hansel | Apr. 12, 1938 |
| 2,282,666 | McCue | May 12, 1942 |
| 2,593,295 | Granfield | Apr. 15, 1952 |